(12) United States Patent
Lawton et al.

(10) Patent No.: US 7,850,878 B2
(45) Date of Patent: Dec. 14, 2010

(54) METHOD OF FORMING A BIOMEDICAL DEVICE INCLUDING AN OPHTHALMIC DEVICE

(75) Inventors: Bruce Lawton, Rochester, NY (US); Daniel Barrows, Rochester, NY (US); Emily A. Gabriel, Pittsford, NY (US); Michael Dobner, Honeoye Falls, NY (US); Craig Barrile-Josephson, Ontario, NY (US); Larry Hovey, Ontario, NY (US); Sandeep Pandit, Rochester, NY (US); Ryan Williams, Rochester, NY (US); Jessica Pierce, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 12/339,745

(22) Filed: Dec. 19, 2008

(65) Prior Publication Data

US 2009/0166904 A1    Jul. 2, 2009

Related U.S. Application Data

(60) Provisional application No. 61/018,143, filed on Dec. 31, 2007.

(51) Int. Cl.
  *B29D 11/00* (2006.01)
(52) U.S. Cl. .................................... 264/1.32; 425/808
(58) Field of Classification Search ................ 264/1.32; 425/808
  See application file for complete search history.

(56) References Cited

U.S. PATENT DOCUMENTS 3,894,710 A    7/1975    Sarofeen
4,091,057 A    5/1978    Weber
4,121,896 A    10/1978   Shepherd
4,197,266 A    4/1980    Clark et al.
4,208,364 A    6/1980    Shepherd
4,209,289 A    6/1980    Newcomb et al.
4,390,482 A    6/1983    Feurer
4,407,766 A    10/1983   Haardt et al.
4,495,313 A    1/1985    Larsen
4,540,534 A    9/1985    Grendol
4,565,348 A    1/1986    Larsen
4,640,489 A    2/1987    Larsen
4,761,069 A    8/1988    Truong et al.

(Continued)

FOREIGN PATENT DOCUMENTS

EP    0447361 A1    9/1991

(Continued)

*Primary Examiner*—Philip C Tucker
*Assistant Examiner*—Alison Hindenlang
(74) *Attorney, Agent, or Firm*—John F. Thomas

(57) ABSTRACT

A method is provided of forming a biomedical device in a casting mold which has an anterior mold section and a posterior mold section, wherein one of the mold sections includes a plurality of radially extending ribs and the remaining mold section includes an annular shoulder for engaging an outer end of the ribs to define a mold cavity. The method includes engaging the mold sections along a peripheral seal of the mold cavity and a plurality of circumferentially spaced contact points on a shoulder of one of the mold sections. Cured excess material bonds to the ribs of the one mold section and provides repeatable retention and location of the excess material after formation of the biomedical device.

18 Claims, 10 Drawing Sheets

U.S. PATENT DOCUMENTS

| | | | |
|---|---|---|---|
| 4,815,690 A | 3/1989 | Shepherd |
| 4,865,779 A | 9/1989 | Ihn et al. |
| 4,921,205 A | 5/1990 | Drew, Jr. et al. |
| 4,944,899 A | 7/1990 | Morland et al. |
| 4,955,580 A | 9/1990 | Seden et al. |
| 5,036,971 A | 8/1991 | Seden et al. |
| 5,071,101 A | 12/1991 | Wood |
| 5,087,015 A | 2/1992 | Galley |
| 5,114,629 A | 5/1992 | Morland et al. |
| 5,143,660 A | 9/1992 | Hamilton et al. |
| 5,158,718 A | 10/1992 | Thakrar et al. |
| 5,160,749 A | 11/1992 | Fogarty |
| 5,200,121 A | 4/1993 | Hagmann et al. |
| 5,238,388 A | 8/1993 | Tsai |
| 5,252,056 A | 10/1993 | Hörner et al. |
| 5,254,000 A | 10/1993 | Friske et al. |
| 5,271,875 A | 12/1993 | Appleton et al. |
| 5,326,505 A | 7/1994 | Adams et al. |
| 5,395,558 A | 3/1995 | Tsai |
| 5,433,898 A | 7/1995 | Thakrar et al. |
| 5,466,147 A | 11/1995 | Appleton et al. |
| 5,517,259 A | 5/1996 | Blum et al. |
| 5,540,410 A | 7/1996 | Lust et al. |
| 5,573,108 A | 11/1996 | Hamilton et al. |
| 5,578,332 A | 11/1996 | Hamilton et al. |
| 5,593,620 A | 1/1997 | Galas |
| 5,611,970 A | 3/1997 | Apollonio et al. |
| 5,620,720 A | 4/1997 | Glick et al. |
| 5,882,698 A | 3/1999 | Su et al. |
| 5,975,875 A | 11/1999 | Crowe, Jr. et al. |
| 6,042,756 A | 3/2000 | Müller et al. |
| 6,071,111 A | 6/2000 | Doke et al. |
| 6,135,594 A | 10/2000 | Windey et al. |
| 6,241,918 B1 | 6/2001 | Calvin et al. |
| 6,257,547 B1 | 7/2001 | Togo et al. |
| 6,258,299 B1 | 7/2001 | Yamashita et al. |
| 6,315,929 B1 | 11/2001 | Ishihara et al. |
| 6,368,522 B1 | 4/2002 | Ansell et al. |
| 6,405,993 B1 | 6/2002 | Morris |
| 6,419,859 B2 | 7/2002 | Tanaka et al. |
| 6,431,706 B1 | 8/2002 | Dean |
| 6,444,145 B1 | 9/2002 | Clutterbuck |
| 6,471,891 B1 | 10/2002 | Cameron |
| 6,491,281 B1 | 12/2002 | Gotou et al. |
| 6,523,953 B2 | 2/2003 | Jahnke |
| 6,551,531 B1 | 4/2003 | Ford et al. |
| 6,568,807 B2 | 5/2003 | Rogers et al. |
| 6,610,220 B1 | 8/2003 | Caltrider et al. |
| 6,638,451 B1 | 10/2003 | Hagmann et al. |
| 6,708,397 B2 | 3/2004 | Parnell, Sr. et al. |
| 6,821,108 B2 | 11/2004 | Hagmann et al. |
| 6,827,325 B2 | 12/2004 | Hofmann et al. |
| 6,830,712 B1 | 12/2004 | Roffman et al. |
| 6,861,123 B2 | 3/2005 | Turner et al. |
| 6,869,549 B2 | 3/2005 | Ansell et al. |
| 6,923,538 B2 | 8/2005 | Dean |
| 6,929,367 B2 | 8/2005 | Jahnke |
| 6,977,051 B2 | 12/2005 | Pegram et al. |
| 6,997,428 B1 | 2/2006 | Andino et al. |
| 6,997,693 B2 | 2/2006 | Hörner et al. |
| 7,008,570 B2 | 3/2006 | Pegram et al. |
| 7,040,886 B2 | 5/2006 | Calvin et al. |
| 7,156,641 B2 | 1/2007 | Ansell et al. |
| 2003/0164563 A1 | 9/2003 | Calvin et al. |
| 2004/0031701 A1 | 2/2004 | Peck et al. |
| 2004/0075182 A1 | 4/2004 | Gobron |
| 2004/0191353 A1 | 9/2004 | Togo et al. |
| 2004/0258939 A1 | 12/2004 | Su et al. |
| 2005/0056953 A1 | 3/2005 | Hofmann et al. |
| 2005/0167864 A1 | 8/2005 | Turner et al. |
| 2006/0051454 A1 | 3/2006 | Ansell et al. |
| 2006/0145369 A1 | 7/2006 | Lawton et al. |
| 2006/0145370 A1 | 7/2006 | Lawton et al. |
| 2006/0145371 A1 | 7/2006 | Lawton et al. |
| 2006/0145372 A1 | 7/2006 | Jones et al. |

FOREIGN PATENT DOCUMENTS

| | | |
|---|---|---|
| EP | 0857565 A1 | 8/1998 |
| GB | 2230730 A | 10/1990 |
| GB | 2235408 A | 3/1991 |

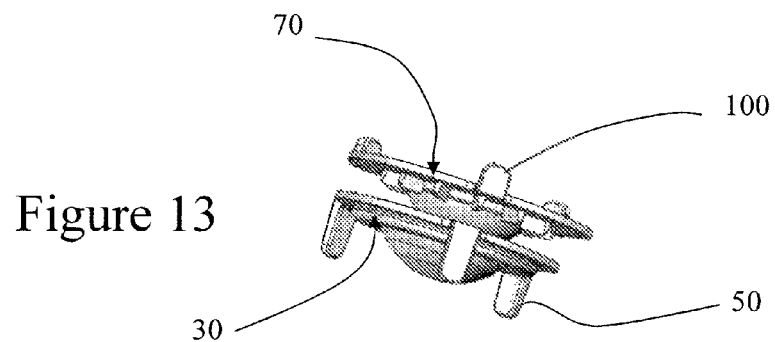
Figure 13
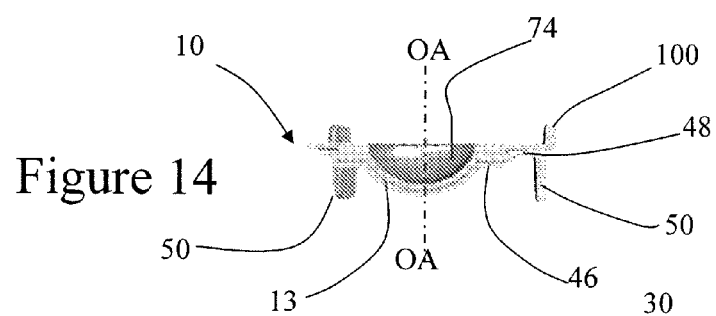
Figure 14
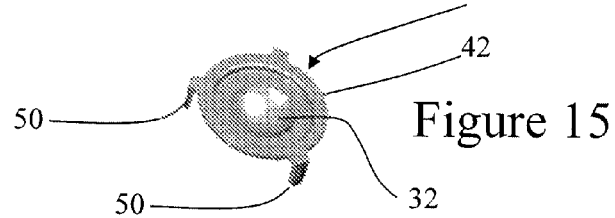
Figure 15
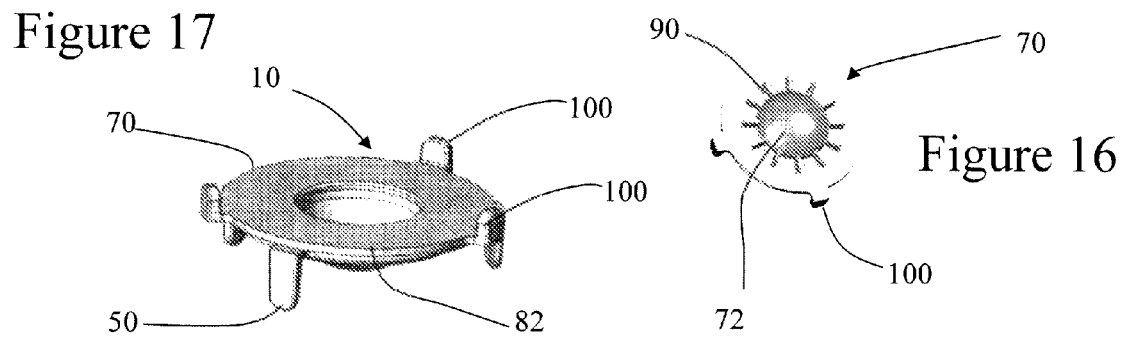
Figure 17
Figure 16

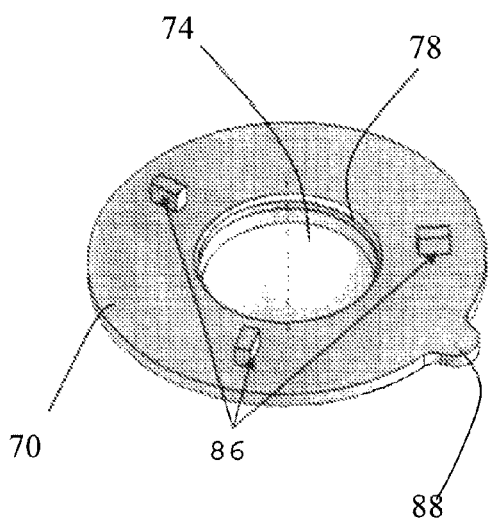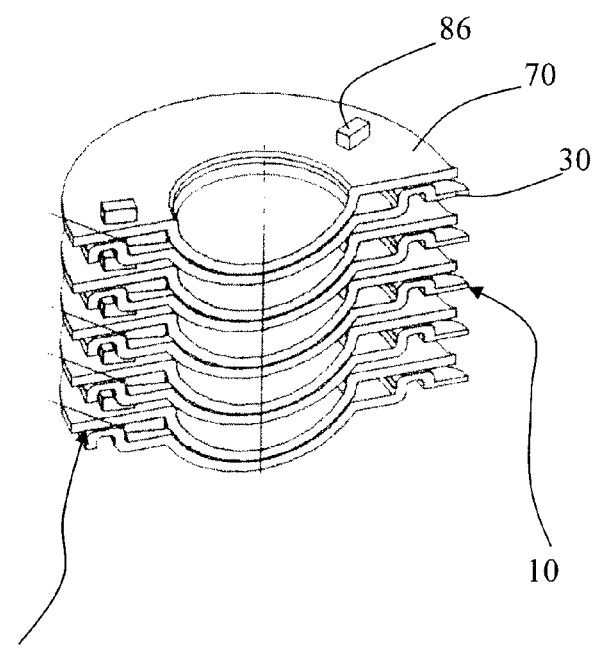
Figure 18
Figure 19

METHOD OF FORMING A BIOMEDICAL DEVICE INCLUDING AN OPHTHALMIC DEVICE

CROSS-REFERENCE TO RELATED APPLICATIONS

The present application claims the benefit of U.S. Provisional Patent Application 61/018,143 filed Dec. 31, 2007, hereby expressly incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to the formation of biomedical devices and, more particularly, to the use of a mold assembly for the formation of an ophthalmic device having an optical surface. The biomedical device is formed in a casting mold having an anterior mold section and a posterior mold section, wherein the mold sections can be operably engaged by an interference fit between ribs on one mold section and an annular shoulder on the second mold section. At least one of the mold sections includes an optical quality surface for imparting a corresponding optical surface on the ophthalmic device.

2. Description of Related Art

One method for making ophthalmic devices such as contact lenses is cast molding. Cast molding of contact lenses involves depositing a curable mixture of a polymerizable lens material, such as a monomer, in a casting mold cavity that is formed by at least two assembled casting mold sections; curing the mixture; disassembling the casting mold sections and removing the molded lens. Post-molding processing steps, for example, hydration in the case of hydrogel lenses, can also be employed. Representative cast molding methods are disclosed in U.S. Pat. No. 5,271,875 (Appleton et al.); U.S. Pat. No. 4,197,266 (Clark et al.); U.S. Pat. No. 4,208,364 (Shepherd); U.S. Pat. No. 4,865,779 (Ihn et al.); U.S. Pat. No. 4,955,580 (Seden et al.); U.S. Pat. No. 5,466,147 (Appleton et al.); and U.S. Pat. No. 5,143,660 (Hamilton et al.).

The configuration of the mold, and particularly the optical surfaces of the mold, at least partially determine the resulting surfaces of the lens. While a significant number of optical defects can be corrected with the molded biomedical devices, as each device typically requires two mold halves, there is a need to optimize the configuration of the casting mold.

BRIEF SUMMARY OF THE INVENTION

In the present method, a casting mold for retaining a volume of curable liquid to form the biomedical device includes a first mold section having a first optical surface and a radially extending first flange; a second mold section having a second optical surface and a radially extending second flange, the first mold section and the second mold section sized to cooperatively engage so as to define a mold cavity therebetween, the mold cavity having an optical axis and a sealed peripheral edge, the mold cavity occupying a given length along the optical axis; one of the first and the second flange including a plurality of radially extending ribs, each rib having a terminal outer end spaced from the optical axis; and a remaining one of the first and the second flange including an axially extending shoulder sized to engage the plurality of ribs. In one configuration, the ribs contact the shoulder at a corresponding plurality of contact points, wherein a normal to the contact point is non perpendicular to the optical axis. The terminal outer ends can be inclined with respect to the optical axis.

The present casting mold can retain a volume of curable liquid, and be employed by disposing a dose of a curable liquid in a first mold section, the first mold section having an optical surface including an optical axis, the optical surface contacting the curable liquid, the first mold section including a radially projecting flange, the flange having a shoulder spaced from the optical surface along the optical axis; and contacting a second mold section with the first mold section to retain at least a portion of the curable liquid in a mold cavity, the second mold section having a plurality of ribs extending radially with respect to the optical axis, with an outer end of the ribs engaging the shoulder being partially deformed.

A method is provided for forming a biomedical device from a retained volume of curable liquid in a casting mold, by providing a first mold section having a convex first optical surface, a radially extending first flange and a plurality of ribs extending axially from one side of the first flange and extending radially to terminate at a free end; providing a second mold section having a concave second optical surface and a radially extending second flange, the second optical surface including a right cylinder wall, and a shoulder axially extending from the second flange; depositing a volume of the curable liquid on the second optical surface; and engaging the first mold section and the second mold section by contacting the free end of each of the plurality of ribs with the shoulder to define a sealed mold cavity between the first optical surface and the second optical surface, with a portion of the right cylinder wall contacting the first optical surface.

Another method is also provided for forming a biomedical device from a retained volume of curable liquid in a casting mold, by injection molding a first mold section, the first mold section having a convex first optical surface and a reverse taper in a first non-optical surface; injection molding a second mold section, the second mold section having a concave second optical surface and a reverse taper in a second non-optical surface; depositing a volume of the curable liquid on the second optical surface; and engaging the first mold section and the second mold section to define a sealed mold cavity retaining the curable liquid between the first mold section and the second mold section.

A method is further contemplated for forming a biomedical device from a retained volume of curable liquid in a casting mold, by providing a first mold section having a convex first optical surface and a radially extending first flange, a plurality of ribs extending axially from one side of the first flange and extending radially to terminate at a free end; providing a second mold section having a concave second optical surface, a radially extending second flange and a shoulder extending axially from the second flange, and engaging the first mold section and the second mold section by an engagement consisting of (i) a sealed edge between the first optical surface and the second optical surface and (ii) a plurality of contact points between the free end of the plurality of ribs and the shoulder to form a mold cavity.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

BRIEF DESCRIPTION OF THE SEVERAL VIEWS OF THE DRAWING(S)

FIG. 13 is a further configuration of the casting mold for forming an ophthalmic device.

FIG. 14 is a cross sectional view of the casting mold of FIG. 13 in an assembled state.

FIG. 15 is a perspective view of the anterior mold section of the casting mold of FIG. 13.

FIG. 16 is a perspective view of the posterior mold section of the casting mold of FIG. 13.

FIG. 17 is a perspective view of the assembled casting mold of FIG. 13.

FIG. 18 is a perspective view of the posterior mold section having a plurality of standoffs.

FIG. 19 is a perspective view of a plurality of assembled casing molds in a stacked configuration, separated by the standoffs.

DETAILED DESCRIPTION OF THE INVENTION

Figure 1:
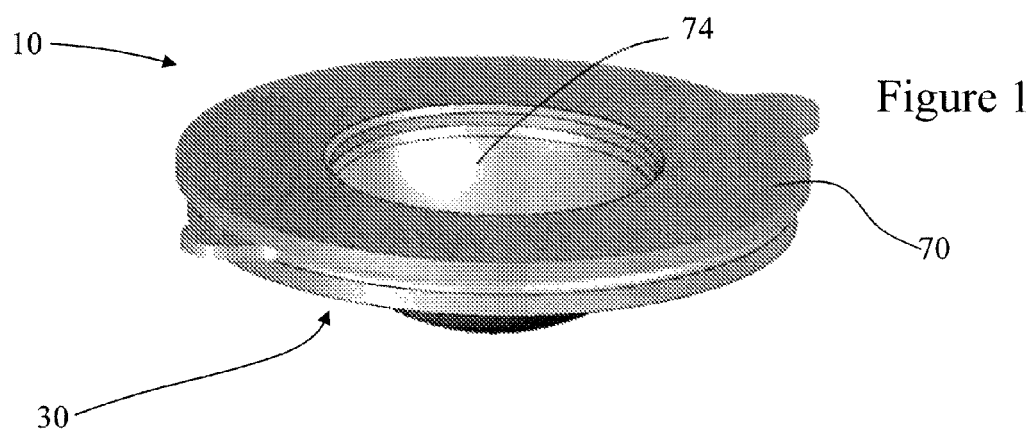
FIG. 1 is a perspective view of an assembled casting mold for forming an ophthalmic device.
Figure 2:
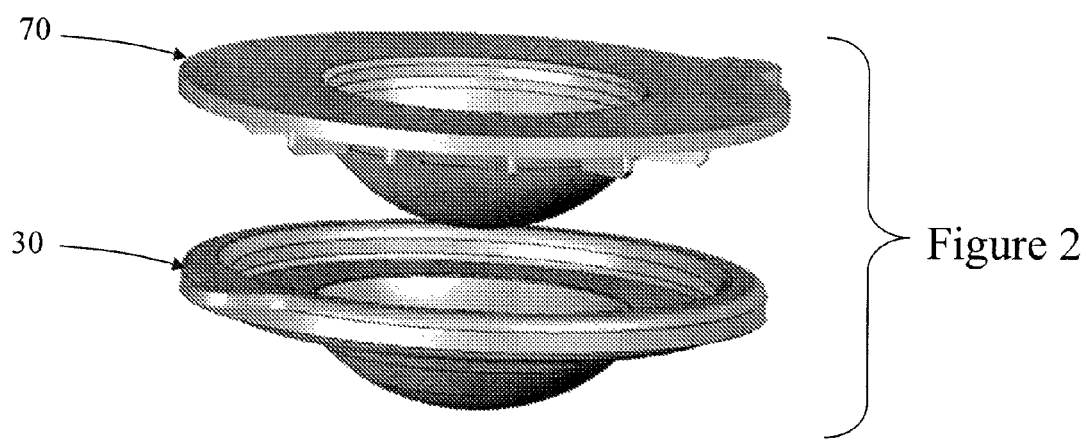
FIG. 2 is an exploded perspective view of the casting mold of FIG. 1.
Figure 3:
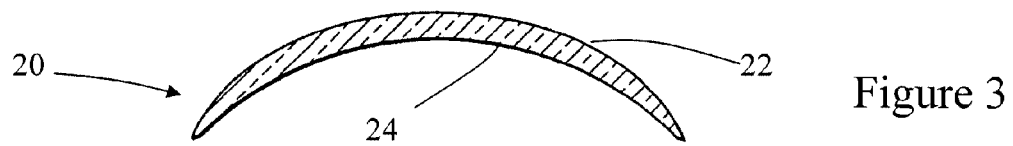
FIG. 3 is a cross sectional view of an ophthalmic device, such as a contact lens formed by the casting mold of FIG. 1.
Figure 4:
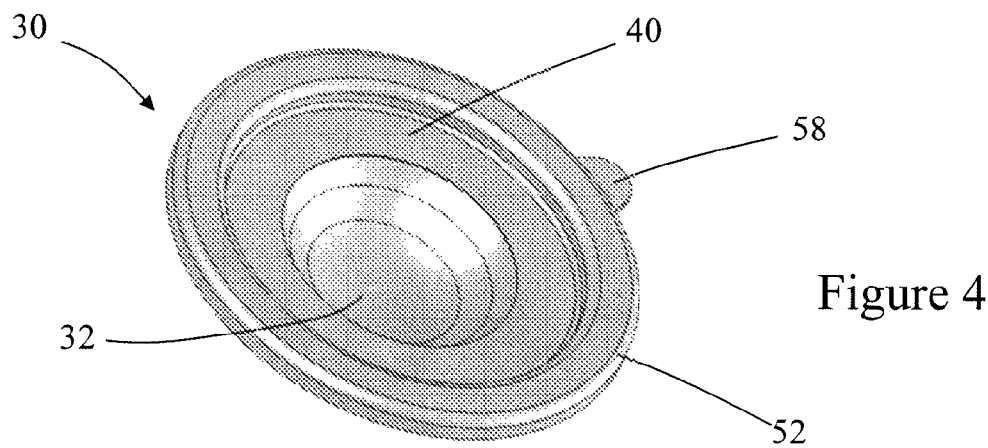
FIG. 4 is perspective view of an anterior mold section of the casting mold of FIG. 1.
Figure 5:
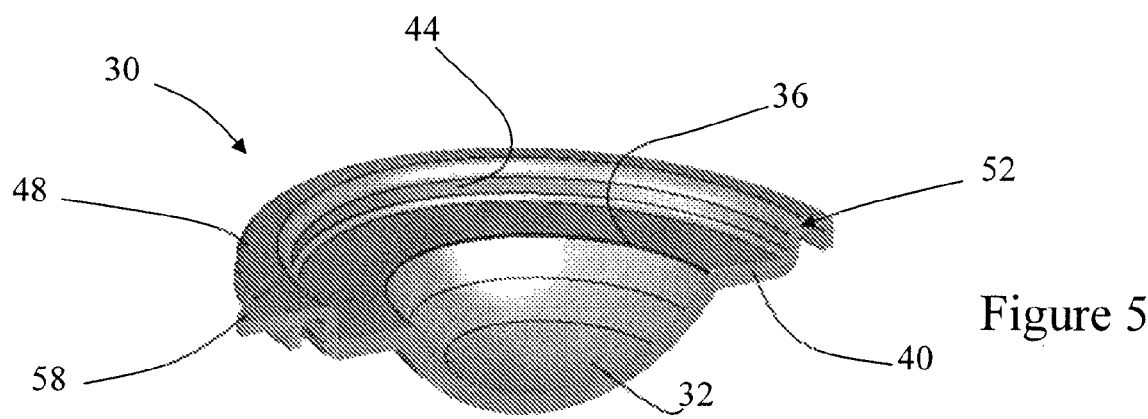
FIG. 5 is a cross sectional view of the anterior mold section of FIG. 4.
Figure 6:
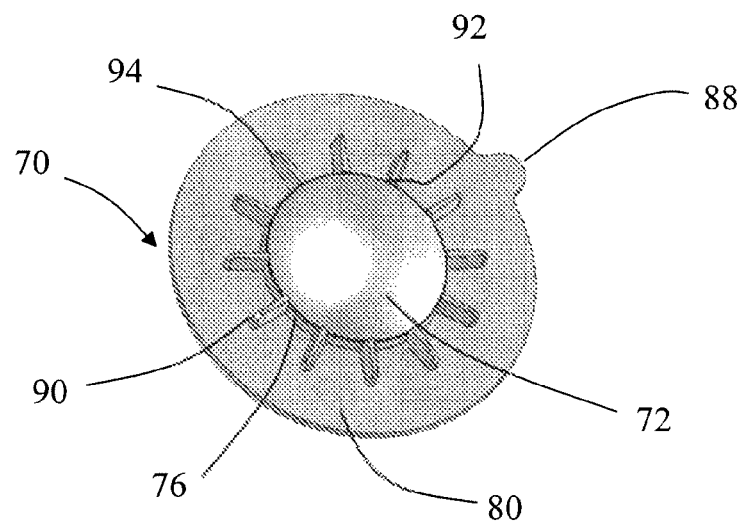
FIG. 6 is a perspective view of a posterior mold section of the casting mold of FIG. 1.
Figure 7:
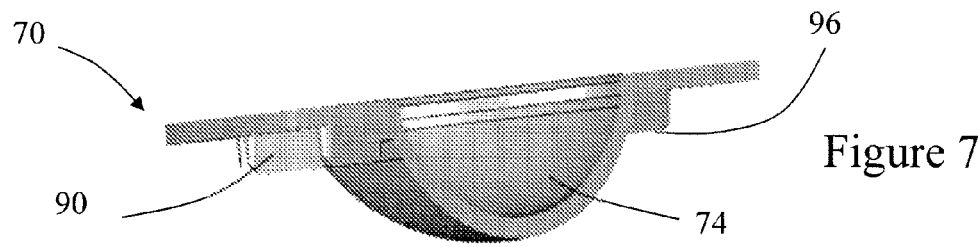
FIG. 7 is a cross sectional view of the posterior mold section of FIG. 6.
Figure 8:
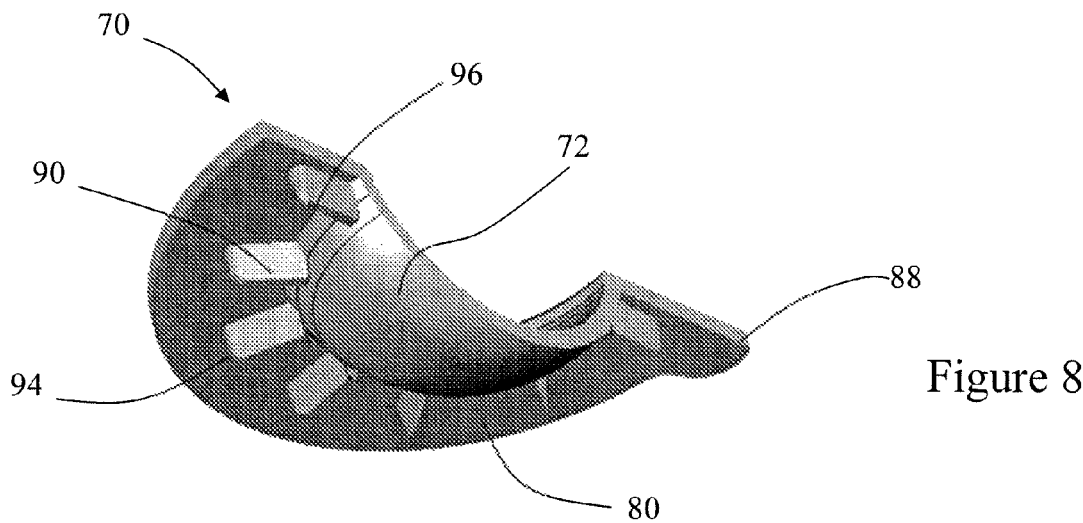
FIG. 8 is another cross sectional view of the posterior mold section of FIG. 6.

Referring to FIGS. 1, 2, 13 and 14, a representative casting mold 10 is shown. The casting mold 10 can be constructed to form any of a variety of biomedical devices such as ophthalmic devices including, but not limited to intraocular lens (IOL) implants, contact lenses, keratoprostheses, corneal rings, corneal inlays and the like. For purposes of description, the casting molds 10 are set forth in terms of forming a contact lens 20 shown in FIG. 3. Even in the description of the casting mold 10 in terms of the contact lens 20, the contact lens can be any of a variety of constructions including, but not limited to spherical, toric or multifocal lenses.

The contact lens 20 includes a convex optical anterior surface 22 and a concave optical posterior surface 24, wherein each surface is constructed to be compatible for contact with the body.

In the configurations shown in FIGS. 1, 2, 13 and 14, the casting mold 10 includes an anterior mold section 30 and a posterior mold section 70. The anterior mold section 30 is often referred to as a front lens curve or preform and the posterior mold section 70 is often referred to as a back lens curve or preform.

Figure 9:
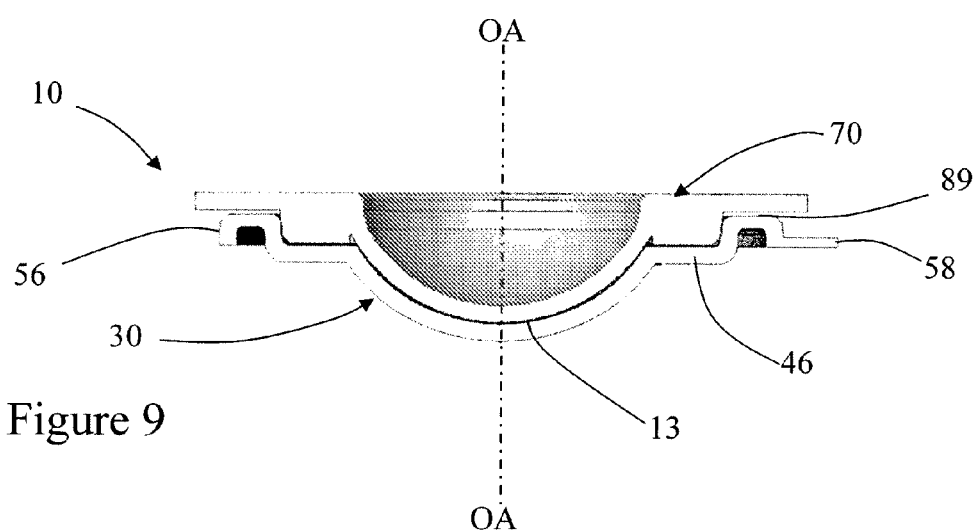
FIG. 9 is a cross sectional view of the assembled casting mold of FIG. 1.

As seen in FIGS. 9 and 14, when assembled the anterior mold section 30 and the posterior mold section 70 form a mold cavity 13 having an optical axis OA.

The anterior mold section 30 forms the anterior convex optical surface 22 of the resulting contact lens 20. Specifically, the anterior mold section 30 includes a central curved area with a concave optical surface 32 and an opposite non-optical surface 34.

As used herein, the term "optical quality" or "optical surface" denotes a molding surface that is sufficiently smooth for forming an optical surface which ultimately forms a surface of the ophthalmic device such as the contact lens 20, e.g., the produced lens is suitable for placement in the eye without the need to machine or polish the formed lens surface. That is, further surface finishing is not required to provide a device suitable for contact with the eye.

The concave optical quality surface 32 has the dimensions, and preferably the power of the anterior surface 22 of the contact lens 20 produced in the casting mold 10. The concave optical surface 32 can be generally defined relative the optical axis OA. The concave optical surface 32 terminates at a peripheral vertex or edge 36, such as a right cylinder (cylindrical) wall which is generally parallel to the optical axis OA.

The anterior mold section 30 includes a radially projecting flange 40 extending from the peripheral vertex 36 of the concave optical quality surface 32. In one construction, the flange 40 extends perpendicular from the right cylinder wall 36 of the concave optical surface 32 (and thus generally perpendicular to the optical axis) to terminate at a peripheral edge 42. Although the flange 40 is shown as concentric with the optical axis OA, it is understood the flange can be asymmetric with respect to the optical axis. The flange 40 can include a radially projecting tab 58, wherein the tab is configured for orientation of the anterior mold section 30 relative to the optical axis OA. Additionally, the tab 58 can be configured to be employed in decapping or separating the mold sections after formation of the contact lens 20.

In one configuration, the flange 40 includes an annular shoulder (or step) 44 radially intermediate the right cylinder wall 36 of the concave optical quality surface 32 and the peripheral edge 42. The shoulder 44 thus splits the flange 40 into an annular, planar bottom shelf 46 and an annular, planar top shelf 48. The bottom shelf 46 of the flange 40 is perpendicular to the right cylinder wall 36 at the intersection with the right cylinder wall, and extends perpendicular to the optical axis OA. The top shelf 48 extends perpendicular to the optical axis OA.

Figure 10:
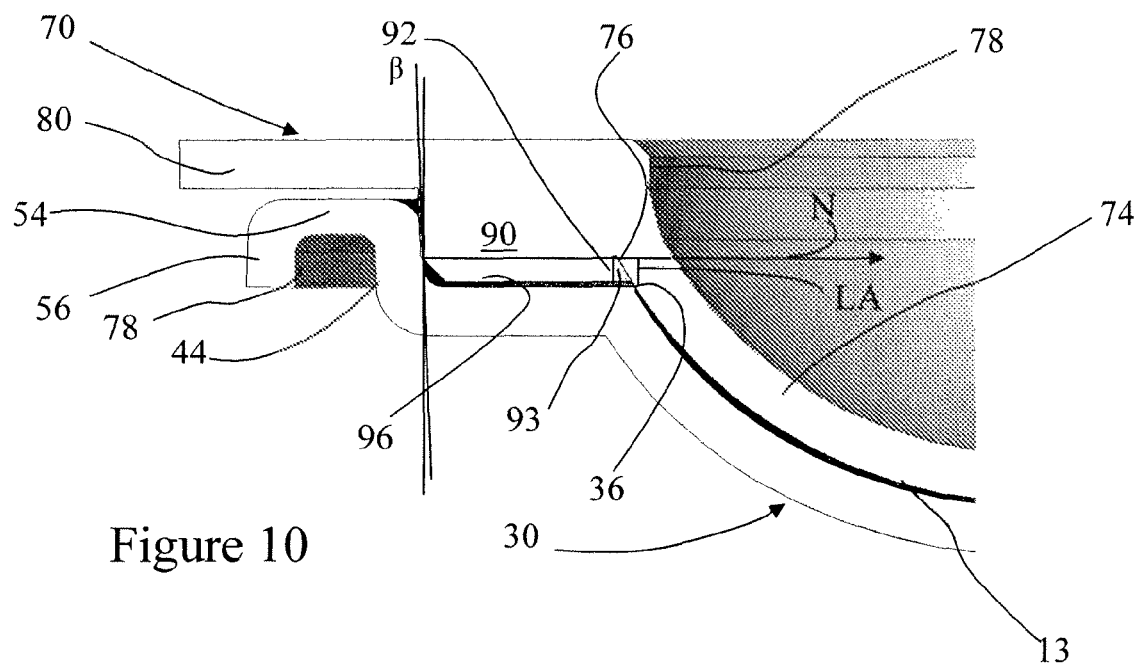
FIG. 10 is an enlarged portion of the cross sectional view of FIG. 9.
Figure 11:
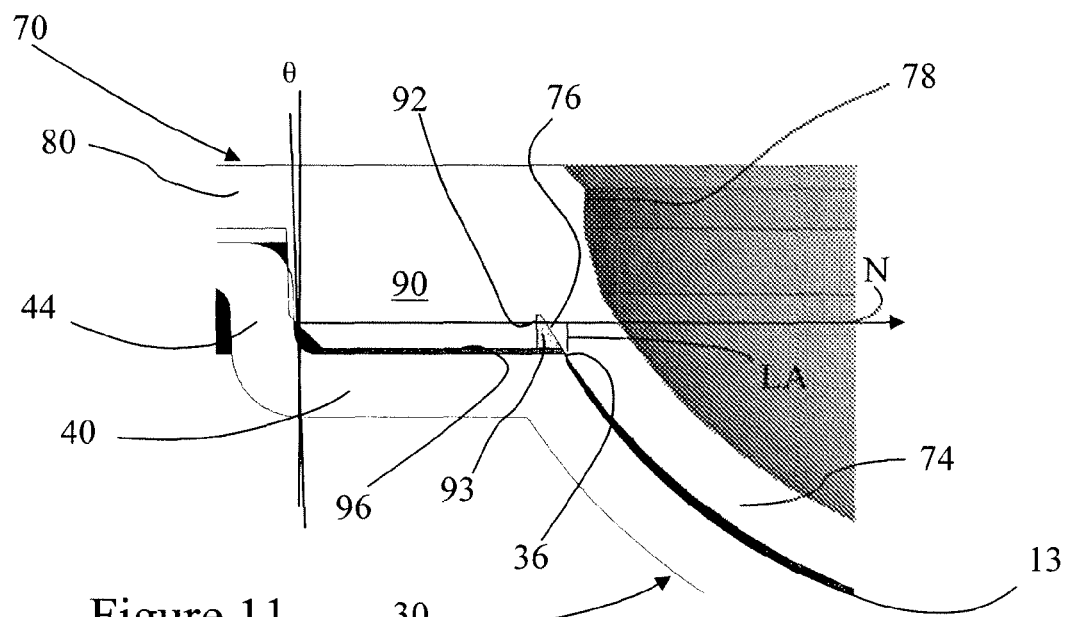
FIG. 11 is an enlarged portion of the cross sectional view of FIG. 10.

Referring to FIGS. 9-11, the shoulder 44 extends along the optical axis OA away from the concave optical surface 32. That is, the shoulder 44 and the concave optical surface 32 do not lie along a common portion of the optical axis OA. The shoulder 44 extends generally parallel to the optical axis OA. However, in selected configurations, the shoulder 44 is inclined relative to the optical axis, such that the portion of the shoulder adjacent to the bottom shelf 46 is nearer the optical axis OA than the portion of the shoulder adjacent the top shelf 48. Thus, the shoulder 44 can be inclined relative to the optical axis OA by an angle θ. The angle θ is typically less than 25°, and can be between approximately 0° and 10°.

Although the shoulder 44 can have a variety of longitudinal dimensions (along the optical axis), a height that is less than the longitudinal dimension of the concave optical quality surface 32 has been found satisfactory. The shoulder 44 and adjacent portions of the flange 40 have a common thickness. However, it is understood at least one of the shoulder 44 and the adjacent bottom shelf 46 and top shelf 48 can have an increased thickness to enhance rigidity of the shoulder. However, for purposes of reducing material requirements, the anterior mold section 30 has a substantially constant thickness.

As shown in FIGS. 13-15, the anterior mold section 30 can also include a plurality of depending legs 50. The legs 50 can be disposed about the peripheral edge 42 and extend in the direction of the concave optical quality surface 32 along the optical axis OA. The legs 50 can extend a sufficient distance along the optical axis OA so that the anterior mold section 30 can be self supporting or stand on the legs. That is, the legs 50 have a greater longitudinal dimension along the optical axis OA than the concave optical surface 32.

The legs 50 can be symmetrically disposed about the peripheral edge 42. Alternatively, the legs 50 can be asymmetrically disposed about the peripheral edge 42, thereby providing an indication of orientation of the anterior mold section 30 and hence concave optical quality surface.

The legs 50 are not of a critical or optical dimension and thus can be employed as vestiges or gates in the formation process of the anterior mold section 30. Further, a single or multiple legs 50 can be employed in the formation process of the anterior mold section 30. The number of legs 50 is at least partially determined by the desired use of the legs. That is, for the legs 50 to provide the self supporting construction, a minimum of three legs is contemplated. While two legs 50 in conjunction with the non-optical surface 34 could be used to provide the self supporting construction, it is advantageous to minimize potentially distorting contact proximal to the concave optical quality surface 32, and hence non-optical surface 34.

As seen in FIGS. 2, 4, 5 and 9-11, in the anterior mold section 30, the shoulder 44 can define an inner surface of an annular rim 52. In this construction, the shoulder 44 again extends along the optical axis OA, a top surface 54 of the rim 52 extends radially outward and an outer wall 56 of the rim extends along the optical axis OA to substantially overlie the shoulder. Upon the inclusion of the legs 50 in this construction, the legs extend from the outer wall 56 of the rim 50 to have a greater longitudinal dimension along the optical axis OA than the concave optical quality surface 32.

The annular rim 52 increases the rigidity of the anterior mold section 30. Thus, the increased rigidity assists the anterior mold section 30 in withstanding various dry lens release methods. For example, upon the application of a release pressure on the top surface 54 of the rim 52, the vertical wall will deflect causing the formed lens to separate from the anterior mold section 30.

In at least selected constructions, the radial dimension of the bottom shelf 46 is less than the radial dimension of the concave optical quality surface 32. That is, the shoulder 44 is nearer to the right cylinder wall 36, than the right cylinder wall is to the optical axis OA.

The peripheral edge 42 of the flange 40 can include an asymmetry such as the tab 58, wherein the tab can be used for alignment purposes of the anterior mold section 30. As set forth below, it is also contemplated the injection molding formation of the anterior mold section 30 can be gated at the tab 58. The tab 58 can be of a substantially planar configuration which is perpendicular, parallel or inclined with respect to the optical axis OA. It is understood the peripheral edge 42 of the anterior mold section 30 can be substantially circular. It is also contemplated the peripheral edge 42 can be symmetric or asymmetric with respect to the optical axis OA. For example, the peripheral edge 42 can define a generally triangular or oval shape.

The posterior mold section 70 forms the posterior concave optical surface 24 of the contact lens 20. The posterior mold section 70 includes a convex optical quality surface 72 and an opposite non-optical surface 74, wherein the convex optical surface defines the surface of the contact lens 20 which contacts the eye and thus has the dimensions of the back surface of the contact lens to be produced by the casting mold 10. The convex optical surface 72 can be generally defined relative the optical axis OA. The convex optical surface 72 is sized to engage the vertex or right cylinder wall 36 of the anterior mold section 30 upon operable assembly of the anterior mold section 30 and the posterior mold section 70. Thus, in view of tolerance and manufacturing considerations, the convex optical quality surface 72 is sized to extend slightly beyond the annular line of engagement with the right cylinder wall 36 of the anterior mold section 30.

Figure 12:
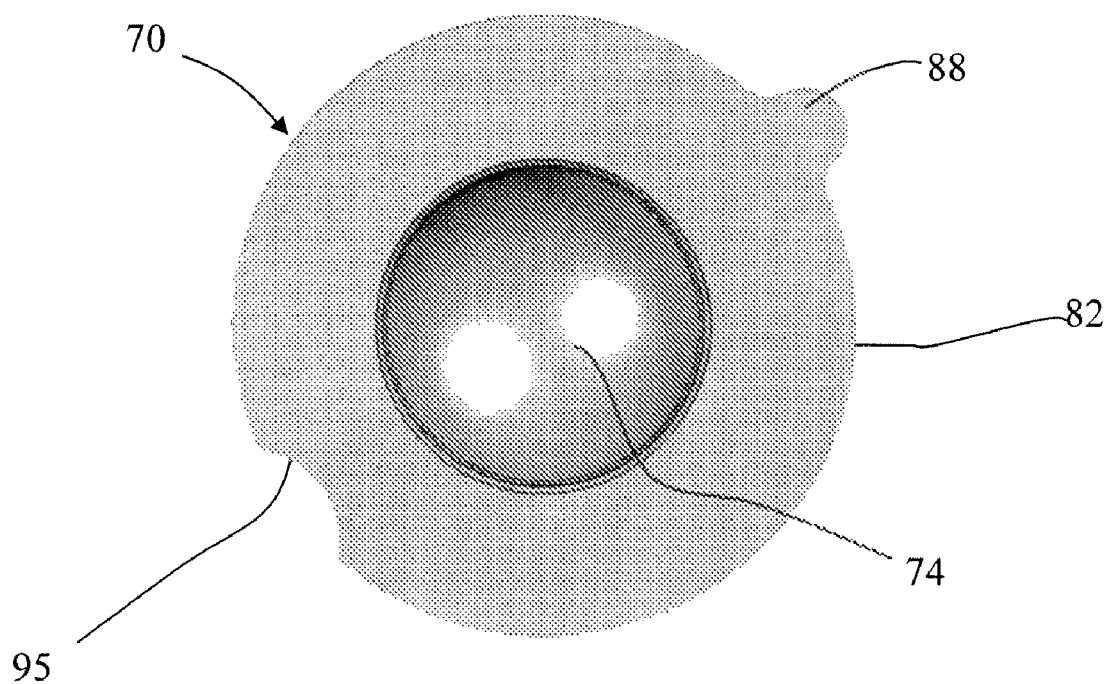
FIG. 12 is a top plan view of an alternative configuration of the posterior mold section.
Figure 20:
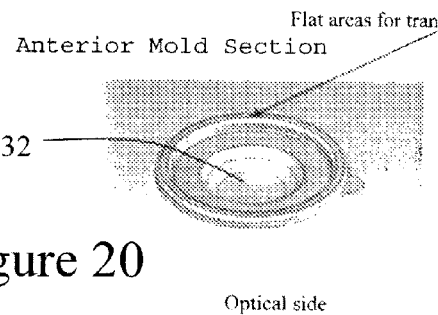
FIG. 20 is a perspective view of the optical side of the anterior mold section showing the flat land areas for transportation contact.
Figure 21:
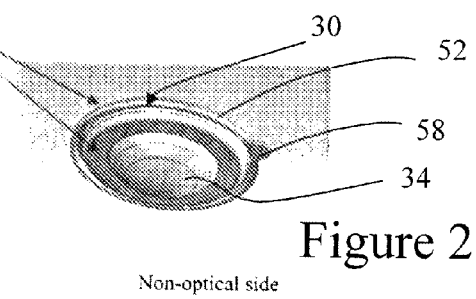
FIG. 21 is a perspective view of the non-optical side of the anterior mold section showing the flat land areas for transportation contact.
Figure 22:
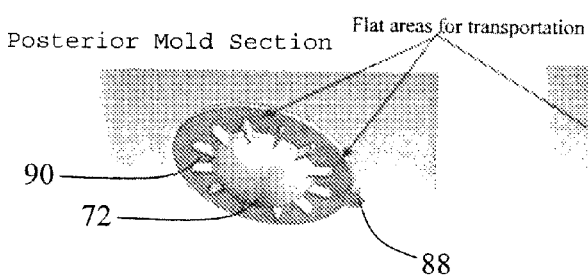
FIG. 22 is a perspective view of the optical side of the posterior mold section showing the flat land areas for transportation contact.
Figure 23:
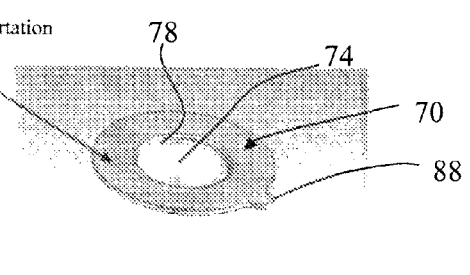
FIG. 23 is a perspective view of the non-optical side of the posterior mold section showing the flat land areas for transportation contact.
Figure 24:
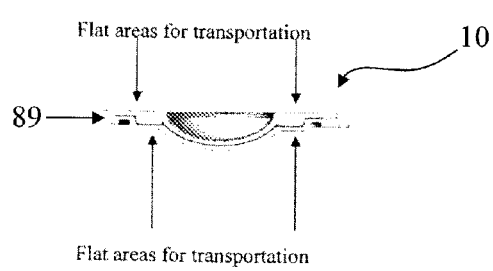
FIG. 24 is a side elevational cross sectional view of the casting mold showing the flat land areas.

The posterior mold section 70 includes a radially projecting flange 80 generally extending from the convex optical quality surface 72. In one construction, the flange 80 extends from the convex optical quality surface 72 to terminate at a peripheral edge 82. The flange 80 extends perpendicular to the optical axis OA, and generally defines a planar top and bottom surface. Although the flange 80 is shown as concentric with the optical axis OA, it is understood the peripheral edge 82 can be asymmetric with respect to the optical axis. The flange 80 is a generally planar construction having a circular periphery concentric with optical axis OA. In a further configuration, the flange 80 as seen in FIGS. 1 and 7-12 can include an outwardly projecting tab 88. As set forth below, it is also contemplated the periphery of the flange 80 can include a recess or scalloped section 95, as shown in FIG. 12, thereby exposing the flange 40 of the anterior mold section 30 when the mold sections are operably engaged.

The peripheral edge 82 of the flange 80 can include an asymmetry such as the tab 88, wherein the tab can be used for alignment purposes of the posterior mold section 70. As set forth below, it is also contemplated the injection molding formation of the posterior mold section 70 can be gated at the tab 88. The tab 88 can be of a substantially planar configuration which is perpendicular, parallel or inclined with respect to the optical axis OA.

In the posterior mold section 70, the convex optical quality surface 72 can extend to intersect the flange 80. Alternatively, as seen in FIGS. 10 and 11, a non-optical band 76 can be formed intermediate the convex optical quality surface 72 and the flange 80. The non-optical band 76 can maintain the general curvature of the convex optical quality surface 72. Alternatively, the non-optical band 76 can be a substantially cylindrical surface.

The external surface of the posterior mold section 70 which incorporates non-optical surfaces includes a reverse taper 78 generally adjacent to or incorporated within the non-optical concave back surface 74 of the convex optical quality surface 72. The reverse taper 78 is a formed surface that is inclined, sloped opposite to, or vertically overlies a portion of the mold section. For example, a line parallel to the optical axis, which intersects a portion of the mold section, then leaves the mold section and again intersects the mold section thus intersects a reverse taper 78. That is, a line parallel to the optical axis or the draft of the mold twice intersects the mold section. Alternatively, for a planar first flange and/or second flange, a line parallel to a normal to the flange passes through two spaced portions of the respective mold section. The reverse taper 78 does not contribute to the assembly of the mold assembly 10 but rather, as subsequently described, to the formation of the posterior mold section 70. In one configuration, as seen in FIGS. 10 and 11, the reverse taper 78 is located at the transition of the non-optical surface 74 and the flange 80. Generally, all the structural features of the mold section taper or slope in the same direction, thereby allowing removal from a tooling mold. However, the present mold sections can include at least one reverse taper surface. The reverse taper resists removal of the mold section from a portion of the respective tooling mold, thereby predictably locating the mold section with respect to the tooling mold.

Referring to FIGS. 2, 6-11, 13, 14 and 16, the posterior mold section 70 includes a plurality of radial ribs 90 projecting from the flange 80 parallel to the optical axis OA and in the direction of the convex optical quality surface 72. The ribs 90 have an inner end 92 and a radially spaced outer end 94. The inner end 92 of the ribs 90 can be coterminous with the convex optical quality surface 72, the non-optical band 76 or both. Alternatively, the inner end 92 of the ribs 90 can be spaced from the convex optical quality surface 72 and the non-optical band 76. That is, a gap 93 can be formed adjacent the inner end 92 of the ribs 90.

The ribs 90 extend along radii generally extending from the optical axis OA. The ribs 90 have a height defined by the dimension along the optical axis OA from the flange 80 to a spaced free edge 96. In one construction, the ribs 90 taper along the height of the ribs. That is, the ribs 90 have a larger circumferential dimension at the flange 80 than at the free edge 96.

In addition, the outer end 94 of the ribs 90 have a taper. The outer end 94 is inclined relative to the optical axis OA. The taper of the outer end 94 is such that the portion of the outer end adjacent the free edge 96 is nearer the optical axis OA than the portion of the outer end adjacent the flange 80. Thus, the outer end 94 of the ribs 90 is inclined relative to the optical axis OA by an angle $\beta$. In one configuration, the angle of inclination $\beta$ of the outer end 94 of the ribs 90 is less than the angle of inclination $\theta$ of the shoulder 44 of the anterior mold section 30. In an alternative configuration, the angle of inclination $\beta$ of the outer end 94 of the ribs 90 and the shoulder 44 are substantially equal. A satisfactory taper (angle of inclination $\beta$) has been found to be approximately 2° wherein the shoulder is parallel to the optical axis OA (the angle $\theta$ is 0°).

The ribs 90 are configured to allow for deformation proximal to the outer end 94 in response to a radially inward compressive force exerted on the outer end. However, for intended operating parameters, the deformation of the rib 90 is not transmitted to the convex optical quality surface 72. Thus, in the construction of the posterior mold section 70 having the inner end 92 of the ribs 90 coterminous with the convex optical quality surface 72, the deformation of the ribs at the outer end 94 does not detrimentally impart a corresponding deformation of the inner end of the ribs or the convex optical quality surface. In the construction employing the non-optical band 76, deformation of the outer end 94 of the ribs 90 does not detrimentally deform the convex optical quality surface 72.

The resistance to transmission of the deformation can be provided by a number of mechanisms including sizing the radial dimension of the rib 90 to absorb the deformation within the length of the rib; separating the inner end 92 of the rib from the convex optical quality surface 72, forming the rib with sufficient material adjacent the inner end; or forming a collapsing, compliant or absorbing region in the rib that accommodates the compressive force (deformation) without transmitting the force radially inward.

The number of ribs 90 is at least partially determined by the intended operating parameters of the casting mold 10, as well as the materials forming the mold sections 30, 70. Typically, the posterior mold section 70 includes between 3 and 30 ribs 90. As seen in FIGS. 10 and 11, a normal N to a contact point between the outer end 94 of the rib 90 and the shoulder 44 extends generally parallel to the flange. It is understood the normal N can be inclined from horizontal (or from perpendicular to the optical axis) by approximately <10°, with preferred configuration of approximately <5° and satisfactory configuration of approximately ≦2°. The normal N represents the direction of force applied by the shoulder 44 onto the ribs 90 and conversely by the ribs onto the shoulder. The force along the normal N generates a lever arm LA about the peripheral sealed edge of the mold cavity 13. Referring to FIG. 10, the lever arm LA is perpendicular to the normal N and intersects the sealed peripheral edge at the wall 36. Thus, the lever arm LA has a length extending from the sealed edge to perpendicularly intersect the normal N.

Although the lever arm LA can be defined by a corresponding solid portion of one of the mold sections 30, 70, it is understood the lever arm is a distance, wherein at least a portion of the distance is outside the physical structure of the anterior mold section 30 and the posterior mold section 70. That is, the lever can overlie a physical portion of one of the mold sections, or can be merely a measure of distance, independent of a supporting structure. The resulting moment from the force along the contact point normal N about the lever arm LA imparts a distorting force on at least one of the optical surfaces 32, 72. For a given force along the normal N, the greater the length of the lever arm LA, the greater the moment and the greater the resulting distorting force. Therefore, the casting mold 10 is constructed to reduce the length of the lever arm. In addition, a lever arm LA of a single size and hence moment exists, in contrast to a plurality of different length lever arms. The ratio of a diameter (or major axis) of the mold cavity 13 to the length of the lever arm LA is preferably greater than 6, in selected configurations greater than 9 and can be greater than 15 to 18. Below a ratio of approximately 5, the thickness of the mold sections must be increased to preclude detrimental deformation of the optical surfaces. That is, by employing a relatively large ratio of an optical diameter to the length of the lever arm LA, the configuration of the casting mold 10 tends to reduce the resulting deforming moment caused by the force along the contact point normal acting about the sealed edge. Specifically, by reducing the length of the lever arm LA, the impacted of the distorting force on the optical surfaces is reduced. In selected configurations, the lever arm LA has a length that is less than a thickness of the mold section forming the optical surface. Thus, the mold sections can have a reduced thickness, which provides for reduced cycling time in manufacture of the mold sections as well as reduced material costs of the mold sections. As seen in FIGS. 10 and 11, the length of the lever arm LA is less than the thickness of the mold section forming at least one of the optical surfaces 32, 72.

Referring to FIGS. 18 and 19, the posterior mold section 70 can further include a plurality of stand offs, or protrusions 86 on the non-optical side of the mold section. It is understood the stand offs 86 can be employed on either or both of the anterior mold section 30 and the posterior mold section 70. For example, the side of the flange 80 opposite to the ribs 90 can include a plurality of stand-offs 86 extending along the optical axis OA. The stand-offs 86 are sized such that, upon stacking posterior mold sections 70, the optical quality surface 72 of one mold section does not contact an adjacent stacked mold section. Thus, for example, the stand-offs 86 are sized to contact the flange 80 or ribs 90 of the adjacent the stacked posterior mold section 70.

Referring to FIGS. 18 and 19, the standoffs 86 can be sized to permit stacking of assembled casting molds 10. The standoffs 86 of the posterior mold section 70 contact the non-optical surface of the anterior mold section 30 in the stacked casting molds and specifically the non-optical side of the flange 40. The standoffs 86 are sized to provide sufficient clearance between adjacent stacked like mold sections or assembled casting molds to at least substantially preclude detrimental mold section deformation in the functionally critical areas of the respective mold sections or molds.

Additionally or alternatively, the posterior mold section 70 also includes a plurality of projecting legs 100. The legs 100 can be disposed about the peripheral edge 82 and extend in the direction away from the convex optical quality surface 72 and along the optical axis OA.

The legs 100 can be symmetrically disposed about the peripheral edge 82. Alternatively, the legs 100 can be asymmetrically disposed about the peripheral edge, thereby providing an indication of orientation of the posterior mold section 70 and hence convex optical quality surface 72. The asymmetry of the legs 100 can correspond to an asymmetry of the legs 50 on the anterior mold section 30 thereby providing for alignment of the mold sections.

The legs 100 are not of critical or optical dimension and thus can be employed as vestiges or gates in the formation process of the posterior mold section 70. Further, a single or multiple legs 100 can be employed in the formation process of the anterior mold section 70. The number of legs 100 is at least partially determined by the desired use of the legs. That is, for the legs 100 to provide the self supporting construction, a minimum of three legs is contemplated. While two legs 100 in conjunction with a portion of the flange 80 could be used to provide the self supporting construction, it is advantageous to minimize potentially distorting contact proximal to the convex optical quality surface 72.

In both the anterior mold section 30 and the posterior mold section 70, the legs 50, 100 are sized to stabilize the respective mold section such the mold section can be staged or conveyed on a flat surface while maintaining a level orientation of the mold section, or assembled casting mold 10. In contrast to prior designs employing a circumferential skirt, the present legs 50, 100 require less material, thereby lower material costs and reduced fixturing requirements, as the present components are self stable.

The flange of one of the anterior mold section 30 and the posterior mold section 70 can include at least one and preferably a plurality of scallops or recesses 95 along the respective periphery. The scallops 95 are sized to expose the flange of the remaining one of the anterior mold section and the posterior mold section. In one construction, the scallops 95 are spaced about the peripheral edge, and specifically the peripheral edge 82 of the flange 80 on the posterior mold section 70, thereby exposing spaced regions of the flange 40 of the anterior mold section 30. The scallops 95 provide access to the interface of the assembled mold sections 30, 70, and thereby facilitate separation of the mold sections. It is contemplated a plurality of scallops 95 can be disposed about the peripheral edge 82 of the flange 80, thereby allowing application of a relatively even or uniform separating force between the mold sections.

Alternatively, or in conjunction with the recesses 95, the peripheral edge 42 of the anterior mold section 30 can be offset from the peripheral edge 82 of the posterior mold section 70, upon operable assembly of the mold 10. Thus, the peripheral edges 42, 82, or at least portions of the respective peripheral edges, are located at different radial positions.

The anterior and posterior mold sections 30, 70 generally have a thickness between approximately 0.2 mm and 1.0 mm with a selected configuration having a thickness of approximately 0.6 mm or less. However, it is understood such dimensions are not required for the benefits of the present invention. The anterior and posterior mold sections 30, 70 can be formed from any of a variety of injection moldable thermoplastic materials such as polystyrene, polypropylene, polyvinyl chloride (PVC), cycloolefins and the like.

As seen in FIGS. 20-24, each of the anterior mold section 30 and the posterior mold section 70 include flat areas (lands) for placement or contact with a fixture, pallet, track or other conveyance or fixturing mechanism. The lands are provided on the top surface 54 of the rim 52, the non-optical side of the flange 40, as well as the exposed portions of the flange 80 on both the optical and non-optical side of the posterior mold section 70. The lands are local flat continuous surfaces sufficiently spaced from the respective optical surface, wherein the lands have a sufficient size to accommodate tolerances in conveyance and fixturing mechanisms.

When mold sections 30 and 70 are assembled, the optical surfaces 32, 72 of the mold sections define the mold cavity 13 in which a biomedical device, such as an ophthalmic device and particularly a contact lens 20 is formed, such as by cast molding. In general, the contact lens 20 is formed by depositing a curable liquid such as a polymerizable monomer and/or macromer into the mold cavity 13, curing the liquid into a solid state, opening the mold cavity and removing the lens. The polymerizable or curable liquid can be any of a variety of materials known in the art as set forth in the following US patents, each of which is hereby expressly incorporated by reference, U.S. Pat. No. 7,297,160 entitled High refractive-index, hydrophilic, arylsiloxy-containing macromonomers and polymers, and ophthalmic devices comprising such polymers; U.S. Pat. No. 7,279,538 entitled Aromatic-based polysiloxane prepolymers and ophthalmic devices produced therefrom; U.S. Pat. No. 7,198,639 entitled Polysilsesquioxane containing polymeric compositions; U.S. Pat. No. 7,176,268 entitled Prepolymers for improved surface modification of contact lenses; U.S. Pat. No. 7,169,874 entitled High refractive index polymeric siloxysilane compositions; U.S. Pat. No. 7,138,440 entitled High refractive index polymeric siloxysilane compositions; U.S. Pat. No. 7,132,494 entitled High refractive index aromatic-based silyl monomers; U.S. Pat. No. 7,132,493 entitled High refractive index aromatic-based prepolymer precursors; U.S. Pat. No. 7,132,492 entitled High refractive index aromatic-based prepolymer precursors; U.S. Pat. No. 7,101,949 entitled High refractive index polymeric siloxysilane compositions; U.S. Pat. No. 7,091,299 entitled High refractive index polymeric siloxysilane compositions; U.S. Pat. No. 7,009,024 entitled High refractive index aromatic-based siloxane difunctional macromonomers; U.S. Pat. No. 7,009,023 entitled High refractive index aromatic-based siloxane difunctional macromonomers; U.S. Pat. No. 7,005,494 entitled High refractive index aromatic-based siloxane monofunctional macromonomers; U.S. Pat. No. 6,992,162 entitled High refractive index aromatic-based siloxane monofunctional macromonomers; U.S. Pat. No. 6,989,430 entitled High refractive index aromatic-based siloxane monofunctional macromonomers; U.S. Pat. No. 6,956,087 entitled High refractive index polysiloxane prepolymers; U.S. Pat. No. 6,951,914 entitled High refractive index aromatic-based prepolymer precursors; U.S. Pat. No. 6,908,978 entitled High refractive index polymeric siloxysilane compositions; U.S. Pat. No. 6,906,162 entitled High refractive index aromatic-based siloxane monofunctional macromonomers; U.S. Pat. No. 6,891,010 entitled Silicone hydrogels based on vinyl carbonate endcapped fluorinated side chain polysiloxanes; U.S. Pat. No. 6,881,809 entitled High refractive index aromatic-based silyl monomers; U.S. Pat. No. 6,881,808 entitled High refractive index aromatic-based siloxane difunctional macromonomers; U.S. Pat. No. 6,864,342 entitled High refractive index aromatic-based prepolymers and U.S. Pat. No. 6,864,341 entitled High refractive index aromatic-based prepolymer precursors. The term curable liquid is intended to encompass any liquid biocompatible polymeric material that forms a subsequent solid opthalmic device, such as by cross linking or polymerization in the mold. The curing can be accomplished by any of a variety of mechanisms know in the art such, but not limited to heat, ultraviolet radiation, infrared radiation, thermal or photo initiated curing.

The curable material for forming the ophthalmic device is cured within the mold cavity to form the predetermined opthalmic device. It is understood that other subsequent processing steps such as hydration of the device or contact lens 20 can then be performed.

A dosed or metered amount of the liquid curable material is disposed in the anterior mold section 30 on the concave optical surface 32.

The assembly of the casting mold 10 requires engagement of the anterior mold section 30 and the posterior mold section 70, which is accomplished by contacting the outer end 94 of the ribs 90 with the shoulder 44 and simultaneously contacting the concave optical quality surface 32 specifically the vertex 36 with the convex optical quality surface 72.

The concave optical quality surface 32 and the convex optical quality surface 72 engage along a generally circular line of contact. Typically, there is slight deformation of the optical surfaces in along the circular line of contact, thereby effectively sealing the mold cavity 13, to retain the curable liquid. Specifically, the right cylinder wall 36 of the optical surface 32 of the anterior mold section 30 seats into the relatively flat optical surface 72 of the posterior mold section 70 to form a pinch off, or circular sealed line. In joining of the anterior mold section 30 and the posterior mold section 70, the outer end 94 of the ribs 90 on the posterior mold section engage the shoulder 44 of the anterior mold section. The free edge 96 and the ribs 90 remain spaced from the shelf 46 and does not contact the flange 40.

As the casting mold 10 is assembled, excess curable material from the concave optical surface 32 is forced from the mold cavity 13 and floods onto the flange 40. The excess curable material on the flange 40 also contacts the ribs 90. Upon curing of the curable material in the mold cavity 13, the excess curable material on the flange 90 is also at least partially cured and adheres or bonds to the ribs 90.

In the configuration in which the angle of inclination of the shoulder 44 is greater than the angle of inclination of the outer end 94 of the rib 90, a circular line of engagement is formed (wherein manufacturing tolerances typically result in a contact zone). This configuration provides enhanced force/area of contact between the anterior mold section 30 and the posterior mold section 70.

In the configuration having equal angles of inclination, the mold sections 30, 70 are generally centered about optical axis OA, wherein the engagement force between the mold sections is distributed throughout the relatively large area of contact. Specifically, as seen in FIGS. 10 and 11, the outer end 94 of the ribs 90 is deformed upon operable engagement of the mold sections 30, 70. As the respective surfaces are configured so that the outer end 94 of the ribs 90 can be deformed or crushed during the assembly process, the ribs are constructed to preclude corresponding deformation of the optical quality surfaces 32, 72. As seen in FIGS. 10 and 11, the outer end 94 of the ribs 90 and the shoulder 44 are configured to define an interfering distance. That is, the interference fit is defined by the otherwise overlapping portions of the ribs 90 and the shoulder 44.

The deformation of the outer end 94 of the ribs 90 is at least elastic deformation, and in selected configurations plastic deformation. The elastic deformation of the outer end 94 results in a visible change in the shape of at least the outer end, such that upon decapping (removing) the poster mold section 70 from the anterior mold section 30, the ribs 90 return to the original shape. When the deformation of the outer end 94 is plastic, there again is a visible change in the shape of the outer end. However, upon decapping, at least a portion of the change in shape remains in the rib 90. Although the elastic and plastic deformation is set forth in terms of the outer end 94 of the ribs 90, it is understood the components can be sized to impart a substantial amount of the deformation to the shoulder 44.

In either configuration, the free edge 96 of the ribs 90 does not contact the bottom shelf 42 of the anterior mold section 30. However, depending upon the volume of excess curable material on the flange 40, the free edge 96 contacts the excess curable material. Further, the top of the shoulder 44 or top surface 54 of the rim 52 is spaced from the flange 80 of the posterior mold section 70 to define a decapping gap 89. The decapping gap 89 between the mold sections 30, 70 in the assembled state can be used to facilitate separation, decapping, of the mold sections upon formation of the ophthalmic device, such as the contact lens 20. As seen in FIGS. 1, 9, 14 and 25, the decapping gap 89 is accessible from any direction. Thus, the casting mold 10 does not necessarily require a preferred angle orientation for decapping. The decapping gap 89 can be accessible from approximately 270° to approximately 360° of the periphery of the casting mold 10.

Figure 25:
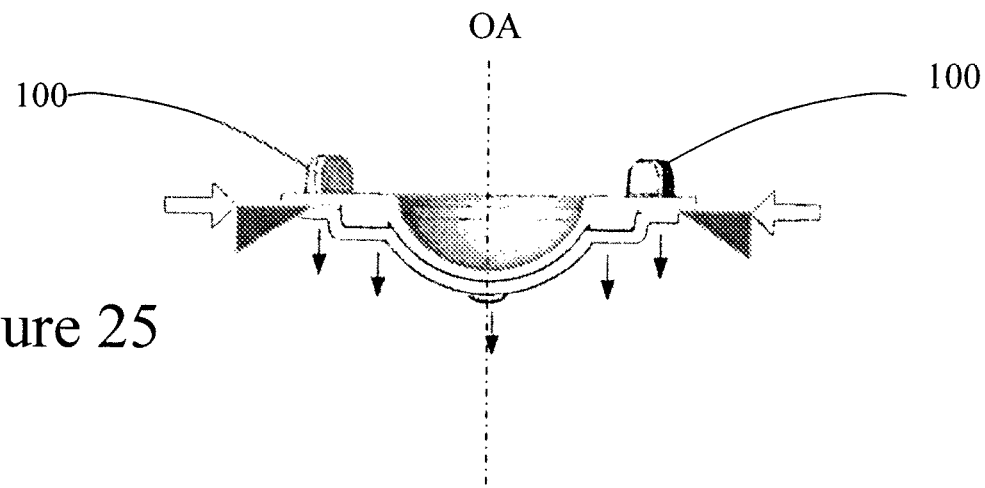
FIG. 25 is a side elevational view of the casting mold showing the access to a continuous circular decapping gap between the anterior mold section and the posterior mold section, the decapping gap being accessed transverse to the optical axis.
Figure 26:
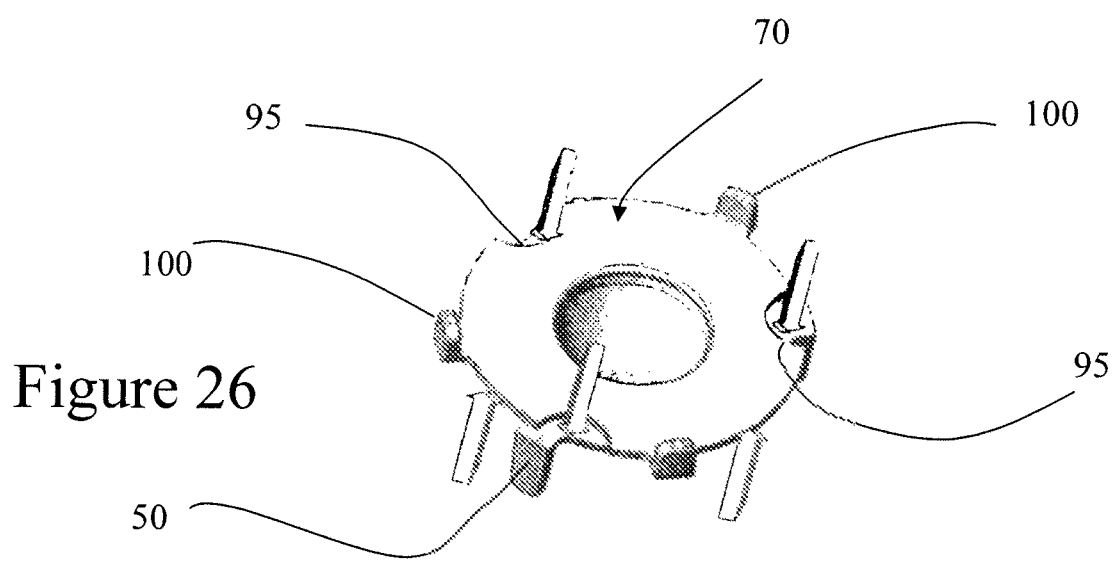
FIG. 26 is a perspective view showing the application of a decapping force parallel to the optical axis, the decapping force applied through a peripheral recess of the mold sections.
Figure 27:
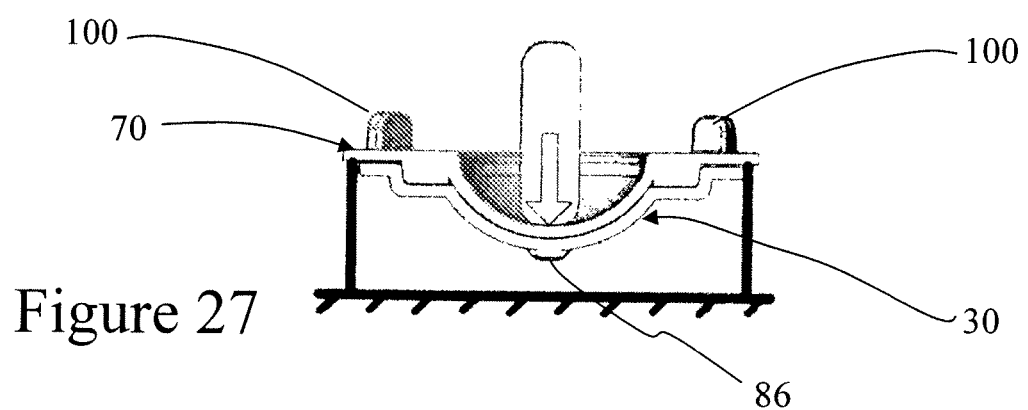
FIG. 27 is a side elevational cross sectional view of the casting mold showing application of a central peen decapping force.

As seen in FIG. 25, the assembled casting mold 10 provides for uninterrupted access to the decapping gap 89 between the anterior mold section 30 and the posterior mold section 70. That is, a mold section parting line is defined between the flange 40 and the flange 80, such that insertion along the mold section parting line is perpendicular to the optical axis OA. Referring to FIG. 26, the respective recesses (scallops) 95 along the respective peripheral edges 42, 82 allow a decapping force applied to the exposed mold section along a line parallel to the optical axis OA. As seen in FIG. 27, the casting mold 10 further allows exertion of a center peen force along the optical axis and against the non-optical surface 74 of the poster mold section 70. It is contemplated any combination of these decapping procedures can be used to separate the mold sections after formation of the ophthalmic device in the mold cavity 13.

As the excess curable material outside the mold cavity 13 adheres or bonds to the ribs 90. Upon decapping (separating the anterior and posterior mold sections 30, 70), the excess at least partially cured material remains attached to the posterior mold section on and between the ribs 90. The adhering of the cured excess material to the ribs 90 provides a predictable location of cured excess material outside of the mold cavity 13, and the casting mold 10 thus provides the process of a repeatable and predictable handling of the excess cured material upon separation of the mold sections 30, 70.

In a further configuration, the anterior mold section 30 and the posterior mold section 70 can be cooperatively joined by the engagement of an annular snap ring on the shoulder 44 of the anterior mold section 30 with a radially projecting nub on the outer end 94 of the ribs 90. The annular snap ring projects radially inward from the shoulder 44, such that the shoulder and the ribs 90 are slightly flexed as the nubs are forced past the shoulder.

In another configuration, the flange 80 of the posterior mold section 70 can include a circular groove open towards the optical surface 72, wherein the groove is sized to receive the rim 52 on the flange 40 of the anterior mold section 30. The groove is sized to form an interference fit with the rim 52 as the optical surfaces 32, 72 engage to form the peripheral seal of the mold cavity 13.

It is further contemplated the flange 80 of the posterior mold section 70 can include a depending skirt or wall, extending in the direction of the optical surface 72, wherein the depending wall is sized to form an interference fit with the shoulder 44 as the optical surfaces 32, 72 engage to seal the mold cavity 13.

The engagement of the anterior mold section 30 and the posterior mold section 70 can also be accomplished by a detent on one of the mold sections for cooperatively engaging a catch on the remaining mold section upon the optical surfaces 32, 72 forming the peripheral seal of the mold cavity 13.

Generally, the casting molds 10 are formed by injection molding a resin into a tooling mold assembly which defines a tooling mold cavity. The tooling mold assembly is mounted in an injection molding apparatus for forming the anterior and posterior mold section 30, 70. Typically, the tooling mold assembly is mounted to and/or fitted into mold plates of the injection molding apparatus. Each of US published patent publication numbers 2006/0145369 published Jul. 6, 2006 (U.S. application Ser. No. 11/026,620 filed Dec. 30, 2004); 2006/0145370 published Jul. 6, 2006 (U.S. application Ser. No. 11/027,380 filed Dec. 30, 2004); 2006/0145371 published Jul. 6, 2006 (U.S. application Ser. No. 11/027,381 filed Dec. 30, 2004) and 2006/0145372 published Jul. 6, 2006 (U.S. application Ser. No. 11/027,406 filed Dec. 30, 2004) is hereby expressly incorporated by reference.

Figure 28:
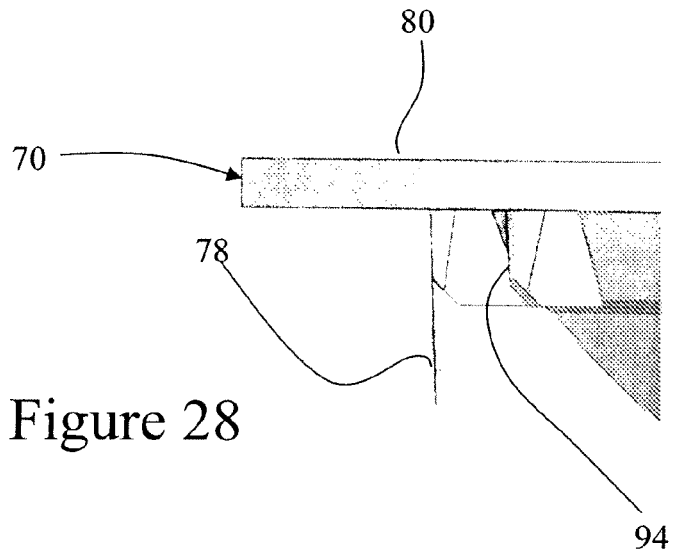
FIG. 28 is an enlarged side elevational view of a portion of the posterior mold section.

In accordance with the above published applications, in the process of injection molding the respective mold sections 30, 70, molten plastic is injected into the metal tooling mold cavity, where the plastic cools to a solid shape taking the form of the surfaces of the tooling mold cavity. The tooling mold cavity has a cavity eject side and a core side. The plastic is delivered to the tooling mold cavity by a molding machine through a series of runner channels and enters the tooling mold cavity through a small hole referred to as a gate. As seen in the Figures, the gate can be interfaced with one of the legs 50, 100 in the respective anterior mold section 30 and posterior mold section 70. Once the injected plastic has at least partially cooled, the tooling mold cavity opens at a predetermined split, referred to as a parting line. The reverse taper provides that the formed mold section remains on a predetermined one of the eject side or the core side of the tooling mold cavity. Once the tooling mold cavity is open, an ejection system pushes the part from the tooling mold cavity. Typically, the formed part (mold section) is removed by a robotic mechanism. As the mold section is ejected, an automation system picks the mold section or mold sections from the tool and transfers the parts to the next stage in the process. After the formed mold section has been removed, the tooling mold cavity is closed and the process repeats. Referring to FIG. 28, in the construction of the ribs 90, the angle of inclination β (taper or draft) facilitates transfer and release from the metal tooling cavity, such that the mold section 70 is initially retained on the eject side during the opening of the tooling mold cavity.

Further, placement of the optical tooling of the tooling mold cavity on the eject side of the base provides for simpler automation by exposing the non-optical surface of the formed mold sections 30, 70 to the pick and place or automatic transfer mechanism. By limiting exposure to the optical surfaces of the formed mold sections 30, 70, the probability of damage to the optical surfaces during handling is decreased. Retention features such as the reverse taper 78 on the posterior mold section 70 are employed to ensure the mold section is transferred with the eject side of the base during the opening of the metal mold. Generally, some portion of reverse taper 78 is provided perpendicular to the direction of draft or the direction the formed part is removed from the tooling mold, or tooling mold cavity. The reverse tapered portion of the formed mold section 30,70 must deformed slightly to overcome the undercut of the solidified material. This force creates retention of the formed mold section ensuring the mold section is in the proper orientation after opening of the tooling mold cavity.

Figure 29:
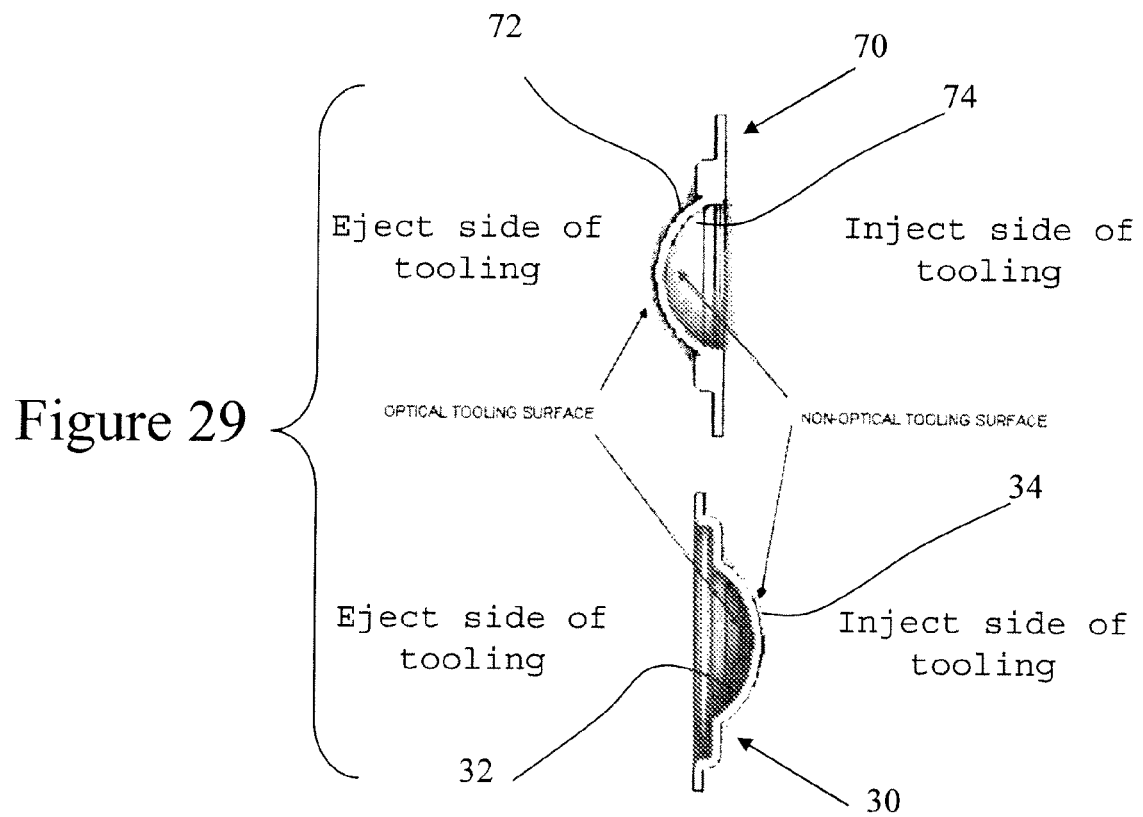
FIG. 29 is a side elevation view showing the relationship of the optical surfaces of the anterior mold section and the posterior mold section with respect to an eject side of tooling.

In formation of the anterior mold section 30, it is contemplated the shoulder 44 forms the reverse taper 78 and shrinks slightly during cooling in the tooling mold and tends to retain the mold section on the eject side of the tooling mold base. In the posterior mold section, the reverse taper 78 retains the formed mold section relative to a portion of the tooling mold cavity. Referring to FIG. 29, the mold sections 30, 70 remain with the eject side to the tooling mold cavity, thereby precluding exposure of the optical surfaces 32, 72 until the respective mold section is removed from the eject side of the tooling mold cavity. Thus, each mold section 30, 70 can include a region of reverse taper to the surface of the tooling mold cavity, thereby forming a retention force of the formed mold section on the respective part of the tooling mold, such as the eject side.

Thus, both the anterior mold section 30 and the posterior mold section 70 an be formed by tooling for injection molding, wherein the tooling generally has a taper or draft in the direction of mold movement to allow mold section ejection or removal from the mold. As plastics shrink when cooled, the draft (the degree of taper of a side wall) is typically selected to allow the molded mold section to be removed from the metal tooling. However, as set forth each of the anterior mold section 30 and the posterior mold section 70 can be formed with a reverse draft, thereby insuring retention of the given mold section on the respective mold tooling. The reverse taper is thus a taper on the sides of the mold section which is perpendicular to the parting plane of the tooling that requires a resilient deformation of the respective mold section for withdrawal from the tooling.

The anterior mold section 30 is sized to provide that the flange 80 has a sufficient radial dimension at the peripheral edge 42 such that a variety of optical surface diameters can be employed within the diameter of the flange, without requiring a change in the radial dimension of the peripheral edge. That is, a common footprint of the anterior mold section 30 can be used, wherein a variety of lens diameters can be formed within the footprint. Further, the external asymmetry such as by the tab 58 or the location of the legs 50 allows for visual axis alignment, as well as verification. It is also contemplated the peripheral edge 42 of the anterior mold section 30 can be smaller than the peripheral edge 82 of the posterior mold section 70, thereby facilitating access to the interface between the mold sections and hence separation (decapping) of the mold sections. Alternatively, the peripheral edge 42 of the anterior mold section 30 can be larger than the peripheral edge 82 of the posterior mold section 70, thereby facilitating access to the interface between the mold sections and hence separation (decapping) of the mold sections.

While the peripheral edges 42 and 82 can be sized to provide the access for decapping, it is also contemplated that one or both of the peripheral edges can define a generally triangular profile, such that operable engagement of the mold sections exposes a portion of each mold section for an axial decapping force, independent of the remaining mold section.

With respect to the posterior mold section 70, the radial dimension of the ribs 90 allows for a relatively constant positioning (formation) of the outer ends 94, while the location of the inner ends 92 can be varied to accommodate different size ophthalmic devices, such as the contact lens 20. In conjunction with the sizing of the peripheral edge 42 of the anterior mold section 30, the larger radial dimension of the peripheral edge 82 of the posterior mold section 70 facilitates decapping of the mold sections. The decoupling of the outer end 94 of the ribs 90 from the defining radius of the convex optical surface 72 (as well as SAG, the length (in mm) of a line drawn from a point on the aspheric lens surface at a distance Y from the optical axis OA to the tangential plane of the aspheric surface vertex) allows the format of the anterior mold section 70 to accommodate various lens sizes without modifying the interface with the anterior mold section 30, or any processing equipment. That is, the defining dimensions of the optical surface 72 are independent of the exact diameter of the outer end 94 of the ribs 90. Further, the reverse taper 78 at the back of the convex curve retains the formed mold section on the eject side of the tooling mold base.

While the disclosed features have been set forth on the anterior mold section 30 or the posterior mold section 70, it is understood the feature could be interchangeably disposed between the anterior mold section or the posterior mold section, and are thus not limited to the specific example set forth in detail. That is, it is contemplated that each of the configurations, or embodiments can include any of the features herein described.

While the invention has been described in conjunction with specific exemplary embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

The invention claimed is:

1. A method of retaining a volume of curable liquid in a casting mold for forming a biomedical device, the method comprising:
    (a) providing a first mold section having a convex first optical surface, a radially extending first flange and a plurality of ribs extending axially from one side of the first flange and extending radially to terminate at a free end;
    (b) providing a second mold section having a concave second optical surface and a radially extending second flange, the second optical surface including a right cylinder wall, and a shoulder axially extending from the second flange;
    (c) depositing the volume of the curable liquid on the second optical surface; and
    (d) engaging the first mold section and the second mold section by contacting the free end of each of the plurality of ribs with the shoulder to define a sealed mold cavity between the first optical surface and the second optical surface, with a portion of the right cylinder wall contacting the first optical surface.

2. The method of claim 1, further comprising forming the ribs to have a radial dimension of at least 5% of a diameter of one of the first optical surface and the second optical surface.

3. The method of claim 1, further comprising plastically deforming the free end of each rib at the corresponding contact point with the shoulder.

4. The method of claim 1, further comprising forming a gating tab in each of the first flange and the second flange.

5. The method of claim 1, further comprising forming a reverse taper in each of the first mold section and the second mold section.

6. The method of claim 1, wherein engaging the first mold section and the second mold section defines a lever arm extending from the sealed edge to perpendicularly intersect a normal to a given contact point, a ratio of a diameter of the mold cavity to a length of the lever arm being greater than 6.

7. The method of claim 1, further comprising:
    (e) disposing an excess of the curable liquid on the second flange;
    (f) at least partially curing a portion of the excess curable liquid to adhere to at least one of the plurality of ribs; and
    (g) separating the first mold section from the second mold section, the cured excess material remaining in contact with the first mold section and separate from the second mold section.

8. A method of retaining a volume of curable liquid in a casting mold for forming a biomedical device, the method comprising:
    (a) providing a first mold section having a first optical surface and a radially extending first flange;
    (b) providing a second mold section having a second optical surface and a radially extending second flange, the first mold section and the second mold section sized to be engaged to define a mold cavity having a sealed edge, wherein one of the first and the second flange includes a plurality of radially extending ribs and a remaining one of the first and the second flange includes an axially extending shoulder sized to engage the plurality of ribs at a corresponding plurality of contact points;

(c) depositing the volume of the curable liquid on the second optical surface; and (d) engaging the first mold section and the second mold section by contacting the free end of each of the plurality of ribs with the shoulder to define the sealed edge of the mold cavity and form a lever arm extending from the sealed edge to perpendicularly intersect a normal to a given contact point, a ratio of a diameter of the mold cavity to a length of the lever arm being greater than 6.

9. The method of claim 8, further comprising forming the ratio of the diameter of the mold cavity to the length of the lever arm to be greater than 10.

10. The method of claim 8, wherein the first optical surface is convex and the first flange includes the plurality of ribs, each rib extending axially from one side of the first flange and terminating radially at a free end;

the second flange includes the shoulder and the second optical surface is concave and includes a right cylinder wall defining a periphery of the second optical surface; and the second mold section and the first mold section are engaged to contact the free end of each of the plurality of ribs at a corresponding plurality of contact points on the shoulder.

11. The method of claim 8, further comprising:

(e) disposing an excess of the curable liquid on the second flange;

(f) at least partially curing a portion of the excess curable liquid to adhere to at least one of the plurality of ribs; and (g) separating the first mold section from the second mold section, the cured excess material remaining in contact with the first mold section and separate from the second mold section.

12. The method of claim 8, further comprising forming the second mold section to include a radially extending second flange and a shoulder extending axially from the second flange.

13. The method of claim 8, wherein the first mold section is formed to include the plurality of ribs; and the second mold section is formed to include the shoulder.

14. The method of claim 8, wherein engaging the first mold section and the second mold section consists of (i) engaging the first mold section and the second mold section along a sealed edge between the first optical surface and the second optical surface and (ii) engaging a plurality of contact points between the free end of the plurality of ribs and the shoulder.

15. The method of claim 8, further comprising forming the first mold section to include the plurality of ribs, the ribs having a radial dimension of at least 5% of a diameter of one of the first optical surface and the second optical surface.

16. A method of retaining a volume of curable liquid in a casting mold for forming a biomedical device, the method comprising:

(a) providing a first mold section having a convex first optical surface and a radially extending first flange, a plurality of ribs extending axially from one side of the first flange and extending radially to terminate at a free end;

(b) providing a second mold section having a concave second optical surface, a radially extending second flange and a shoulder extending axially from the second flange, and (c) engaging the first mold section and the second mold section by an engagement consisting of (i) a sealed edge between the first optical surface and the second optical surface and (ii) a plurality of contact points between the free end of the plurality of ribs and the shoulder to form a mold cavity.

17. The method of claim 16, further comprising forming a right cylinder wall in the second optical surface.

18. The method of claim 16, further comprising:

(d) disposing an excess of the curable liquid on the second flange;

(e) at least partially curing a portion of the excess curable liquid to adhere to at least one of the plurality of ribs; and (f) separating the first mold section from the second mold section, the cured excess material remaining in contact with the first mold section and separate from the second mold section.

\* \* \* \* \*